(12) United States Patent
Barker et al.

(10) Patent No.: US 8,128,974 B2
(45) Date of Patent: *Mar. 6, 2012

(54) PRODUCTION OF MUSTARD SEED PROTEIN ISOLATE

(75) Inventors: Larry D. Barker, Winnipeg (CA); Ronald W. Martens, Altona (CA); E. Donald Murray, Eden Mills (CA)

(73) Assignee: Burcon Nutrascience (MB) Corp., Winnipeg, Manitoba (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/458,266

(22) Filed: Jul. 7, 2009

(65) Prior Publication Data

US 2009/0275733 A1    Nov. 5, 2009

Related U.S. Application Data

(63) Continuation of application No. 10/137,391, filed on May 3, 2002.

(51) Int. Cl.
*A61K 36/31* (2006.01)
*A61K 36/00* (2006.01)
(52) U.S. Cl. .................. 424/755; 424/776; 424/725
(58) Field of Classification Search .................. None
See application file for complete search history.

(56) References Cited

U.S. PATENT DOCUMENTS 4,158,656 A    6/1979   Jones et al.
(Continued)

FOREIGN PATENT DOCUMENTS

GB    2077739    12/1981
(Continued)

OTHER PUBLICATIONS

Kolbasyuk, V. Food Market of Russia, p. 48-50; (2000).
(Continued)

*Primary Examiner* — Christopher R Tate
*Assistant Examiner* — Randall Winston
(74) *Attorney, Agent, or Firm* — Michael I. Stewart; Sim & McBurney

(57) ABSTRACT

Mustard seed protein isolates are produced at a high purity level of at least about 100 wt % (N×6.25) by a process wherein mustard seed protein is extracted from mustard seed meal, the resulting aqueous mustard seed protein solution is concentrated to a mustard seed protein content of at least about 200 g/L, and the concentrated mustard seed protein solution is added to chilled water having a temperature below about 15° C. to form mustard seed protein micelles, which are settled to provide a mustard seed protein micellar mass (PMM). The mustard seed protein micellar mass is separated from supernatant and may be dried.

20 Claims, 1 Drawing Sheet

U.S. PATENT DOCUMENTS

| | | | |
|---|---|---|---|
| 4,169,090 A | 9/1979 | Murray et al. | |
| 4,208,303 A | 6/1980 | Sasaki et al. | |
| 4,208,323 A | 6/1980 | Murray et al. | |
| 4,285,862 A | 8/1981 | Murray et al. | |
| 4,418,013 A | 11/1983 | Cameron et al. | |
| 5,689,043 A * | 11/1997 | Broekaert et al. | 800/301 |
| 5,844,086 A * | 12/1998 | Murray | 530/377 |
| 6,005,076 A * | 12/1999 | Murray | 530/377 |
| 6,992,173 B2 * | 1/2006 | Milanova et al. | 530/377 |
| 7,087,720 B2 * | 8/2006 | Murray et al. | 530/377 |
| 2003/0060607 A1 * | 3/2003 | Diosady et al. | 530/418 |
| 2003/0125526 A1 | 7/2003 | Barker et al. | |
| 2004/0034200 A1 | 2/2004 | Logie et al. | |
| 2004/0039174 A1 | 2/2004 | Barker et al. | |
| 2004/0254353 A1 | 12/2004 | Barker et al. | |
| 2005/0181112 A1 | 8/2005 | Schweizer et al. | |

FOREIGN PATENT DOCUMENTS

| | | |
|---|---|---|
| JP | 11-506619 | 6/1999 |
| WO | WO 02/089597 | 11/2002 |
| WO | WO 03/043439 | 5/2003 |
| WO | WO 03/088760 | 10/2003 |
| WO | WO 2005/067729 | 7/2005 |

OTHER PUBLICATIONS

Murray, D. Rapeseed: A potential global source of high quality plant protein, Asia Pacific Food Industry, Apr. 2001 p. 30-34.

Yew-Min Tzeng et al. Journal of Food Science, Institute of Tech. Chicago, Sep. 1, 1988 53(5), p. 1537-41.

* cited by examiner

US 8,128,974 B2

PRODUCTION OF MUSTARD SEED PROTEIN ISOLATE

REFERENCE TO RELATED APPLICATIONS

This application is a continuation of U.S. patent application Ser. No. 10/137,391 filed May 3, 2002, which, in turn, claims priority under 35 USC 119(e) from copending U.S. Patent application No. 60/288,415 filed May 4, 2001, 60/326,987 filed Oct. 5, 2001, 60/331,066 filed Nov. 7, 2001, 60/333,494 filed Nov. 28, 2001 and 60/374,801 filed Apr. 24, 2002.

FIELD OF THE INVENTION

The present invention relates to improved methods for manufacturing oil seed protein isolate, particularly a canola protein isolate.

BACKGROUND TO THE INVENTION

In U.S. Pat. Nos. 5,844,086 and 6,005,076 ("Murray II"), assigned to the assignee hereof and the disclosures of which are incorporated herein by reference, there is described a process for the isolation of protein isolates from oil seed meal having a significant fat content, including canola oil seed meal having such content. The steps involved in this process include solubilizing proteinaceous material from oil seed meal, which also solubilizes fat in the meal, and removing fat from the resulting aqueous protein solution. The aqueous protein solution may be separated from the residual oil seed meal before or after the fat removal step. The defatted protein solution then is concentrated to increase the protein concentration while maintaining the ionic strength substantially constant, after which the concentrated protein solution may be subjected to a further fat removal step. The concentrated protein solution then is diluted to cause the formation of a cloud-like mass of highly associated protein molecules as discrete protein droplets in micellar form. The protein micelles are allowed to settle to form an aggregated, coalesced, dense, amorphous, sticky, gluten-like protein isolate mass, termed "protein micellar mass" or PMM, which is separated from the residual aqueous phase and dried.

The protein isolate has a protein content (as determined by Kjeldahl N×6.25) of at least about 90 wt %, is substantially undenatured (as determined by differential scanning calorimetry) and has a low residual fat content. The term "protein content" as used herein refers to the quantity of protein in the protein isolate expressed on a dry weight basis. The yield of protein isolate obtained using this procedure, in terms of the proportion of protein extracted from the oil seed meal which is recovered as dried protein isolate was generally less than 40 wt %, typically around 20 wt %.

The procedure described in the aforementioned Murray II patent was developed as a modification to and improvement on the procedure for forming a protein isolate from a variety of protein source materials, including oil seeds, as described in U.S. Pat. No. 4,208,323 (Murray IB). The oil seed meals available in 1980, when U.S. Pat. No. 4,208,323 issued, did not have the fat contamination levels of the canola oil seed meals available at the time of the Murray II patents, and, as a consequence, the procedure of U.S. Pat. No. 4,208,323 cannot produce from such oil seed meals processed according to the Murray II process, proteinaceous materials which have more than 90 wt % protein content. There is no description of any specific experiments in U.S. Pat. No. 4,208,303 carried out using rapeseed (canola) meal as the starting material.

U.S. Pat. No. 4,208,323 itself was designed to be an improvement on the process described in U.S. Pat. Nos. 4,169,090 and 4,285,862 (Murray IA) by the introduction of a concentration step prior to dilution to form the PMM. The Murray IA patents describe one experiment involving rapeseed but provides no indication of the purity of the product. The concentration step described in the Murray IB patent served to improve the yield of protein isolate from around 20% for the Murray IA process.

SUMMARY OF INVENTION

It has now been found that it is possible to improve these prior art protein isolate processes as they apply to oil seeds, particularly canola, to obtain improved yields of dried protein isolate, in terms of the proportion of protein extracted from the oil seeds, of at least about 40 wt % and often much higher, at least about 80 wt %, and protein isolates of higher purity, at least about 100 wt % at a Kjeldahl nitrogen conversion rate of N×6.25.

It has further been found that a significant proportion of the canola protein extracted from the meal in the process of Murray IA and IB and Murray II, as applied to canola meal, is lost as a result of discarding the supernatant from the PMM-formation step. A further improvement on the prior procedure is provided herein, which improves the overall yield of protein, wherein protein present in the supernatant is recovered generally by a process of concentration to remove impurities and drying the concentrate. The product obtained from the supernatant generally has a protein content (N×6.25) of greater than 100% and is a novel canola protein isolate product. Such novel product provides a further aspect of the invention.

As a further improvement on the prior procedure, the concentrated supernatant may be mixed with the PMM and the mixture dried. Alternatively, a portion of the concentrated supernatant may be mixed with at least a portion of the PMM and the resulting mixture dried. The latter products are novel canola protein isolate products and constitute a further aspect of the invention.

In accordance with one aspect of the present invention, there is provided a process of preparing a protein isolate, which comprises (a) extracting an oil seed meal at a temperature of at least about 5° and preferably up to about 35° C. to cause solubilization of protein in said oil seed meal and to form an aqueous protein solution having a protein content of about 5 to about 25 g/L and a pH of about 5 to about 6.8, (b) separating the aqueous protein solution from residual oil seed meal, (c) increasing the protein concentration of said aqueous protein solution to at least about 200 g/L while maintaining the ionic strength substantially constant by using a selective membrane technique to provide a concentrated protein solution, (d) diluting said concentrated protein solution into chilled water having a temperature of below about 15° C. to cause the formation of protein micelles; (e) settling the protein micelles to form an amorphous, sticky, gelatinous gluten-like protein micellar mass, and (f) recovering the protein micellar mass from supernatant having a protein content of at least about 100 wt % as determined by Kjeldahl nitrogen× 6.25 on a dry weight basis. The recovered protein micellar mass may be dried. The protein isolate is substantially undenatured (as determined by differential scanning calorimetry).

The protein isolate product in the form of protein micellar mass is described herein as "gluten-like". This description is intended to indicate the appearance and feel of the isolate are similar to those of vital wheat gluten and is not intended to indicate chemical identity to gluten.

In one embodiment of this process, supernatant from the settling step is concentrated and the resulting concentrated supernatant is dried to provide a protein isolate having a protein content of at least about 90 wt % (N×6.25) on a dry weight basis. Such protein isolate is a novel product and is provided in accordance with further aspect of the invention.

In another embodiment of this process, supernatant from the settling step is concentrated, the resulting concentrated supernatant is mixed with the protein micellar mass prior to drying the same, and the resulting mixture is dried to provide a protein isolate having a protein content of at least about 90 wt % (N×6.25) on a dry weight basis. Such protein isolate is a novel product and is provided in accordance with another aspect of the invention.

In a further embodiment of the invention, supernatant from the resulting step is concentrated and a portion only of the resulting concentrated supernatant is mixed with at least a portion of the protein micellar mass prior to drying the same to provide other novel protein isolates according to the invention having a protein content of at least about 90 wt % (N×6.25) on a dry weight basis.

A key step in the process of the present invention and the ability to obtain higher yields of protein isolate at purities of at least 100 wt % than previously attained is concentration of the protein solution to a protein content of at least about 200 g/L, a much higher value than in the prior procedures described above. Another key step is the step of warming the concentrated protein solution, as necessary, prior to dilution into chilled water at a dilution rate of less than 1:15, when protein micellar mass only is recovered. This specific combination of parameters is not described in the prior art nor are the beneficial results of high protein yield and high purity protein isolate described therein. An additional step in improving protein yield, particularly in the case of canola meal, is the recovery of additional quantities of protein from the supernatant from the PMM formation and settling step.

In accordance with another aspect of the invention, there is provided a process for preparing a canola protein isolate of reduced pigmentation, which comprises (a) extracting canola oil seed meal at a temperature of at least 5° C. to cause solubilization of protein in said canola oil seed meal and to form an aqueous protein solution having a protein content of about 5 to about 25 g/L and a pH of about 5 to about 6.8; (b) separating the aqueous protein solution from residual canola oil seed meal; (c) subjecting the aqueous protein solution to a pigment removal step; (d) increasing the protein concentration of said aqueous protein solution to at least about 200 g/L while maintaining the ionic strength substantially constant by using a selective membrane technique to provide a concentrated protein solution; (e) diluting said concentrated protein solution into chilled water having a temperature below about 15° C. to cause the formation of protein micelles; (f) settling the protein micelles to form an amorphous, sticky, gelatinous, gluten-like micellar mass; and (g) recovering the protein micellar mass from supernatant having a protein content of at least about 90 wt % as determined by Kjeldahl nitrogen×6.25 on a dry weight basis.

The protein isolate produced according to the process herein may be used in conventional applications of protein isolates, such as, protein fortification of processed foods, emulsification of oils, body formers in baked goods and foaming agents in products which entrap gases. In addition, the protein isolate may be formed into protein fibers, useful in meat analogs, may be used as an egg white substitute or extender in food products where egg white is used as a binder. The canola protein isolate may be used as nutritional supplements. Other uses of the canola protein isolate are in pets foods, animal feed and in industrial and cosmetic applications and in personal care products.

GENERAL DESCRIPTION OF INVENTION

Figure 1:
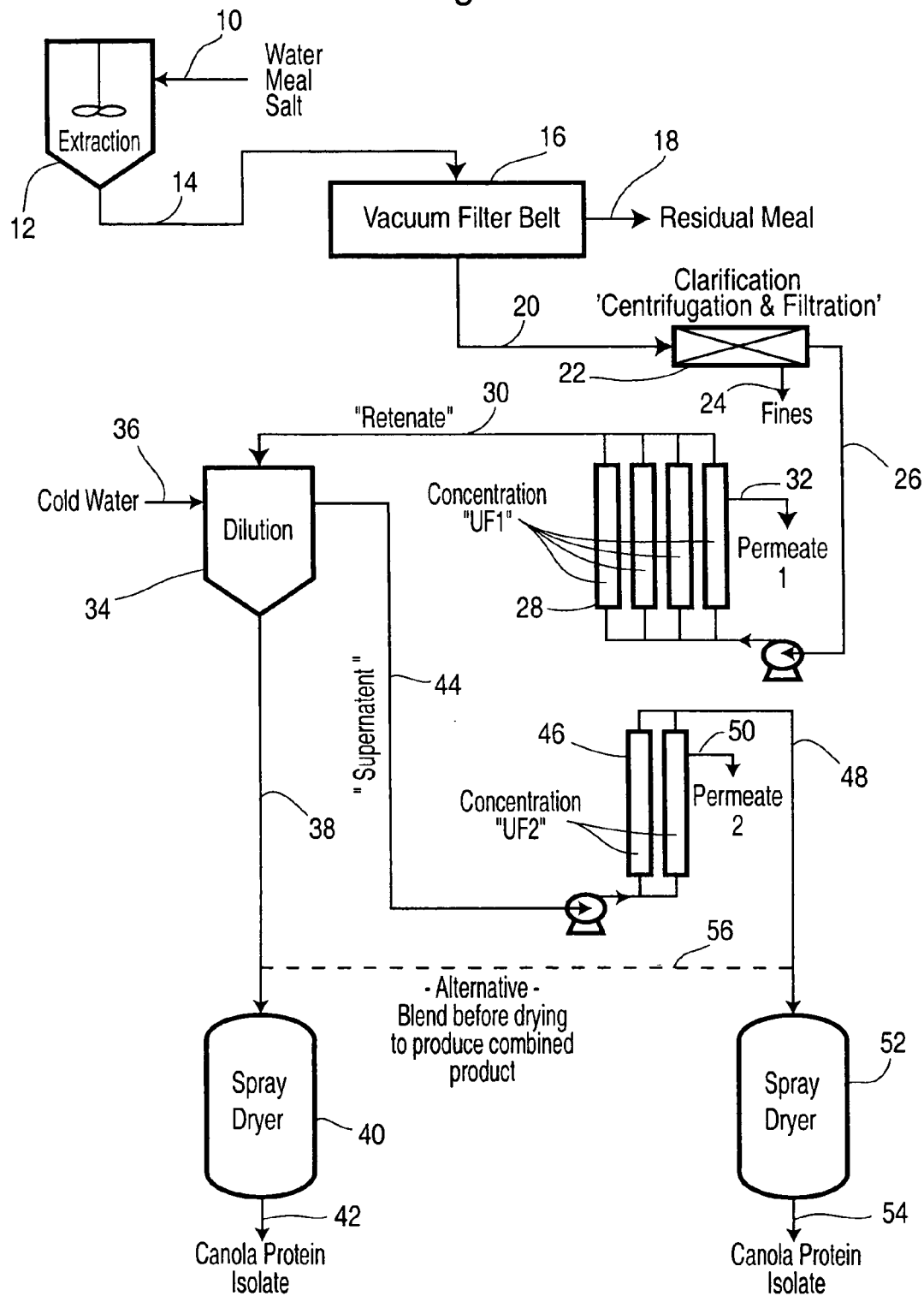
FIG. 1 is a schematic flow sheet of a procedure for producing an oil seed protein isolate as well as other products in accordance with one embodiment of the invention.

The initial step of the process of this invention involves solubilizing proteinaceous material from oil seed meal, particularly canola meal, although the process may be applied to other oil seed meals, such as soybean, traditional rapeseed, traditional flax, linola, sunflower and mustard oil seed meals. The invention is more particularly described herein with respect to canola seed meal.

The proteinaceous material recovered from canola seed meal may be the protein naturally occurring in canola seed or other oil seed or the proteinaceous material may be a protein modified by genetic manipulation but possessing characteristic hydrophobic and polar properties of the natural protein. The canola meal may be any canola meal resulting from the removal of canola oil from canola oil seed with varying levels of non-denatured protein, resulting, for example, from hot hexane extraction or cold oil extrusion methods. The removal of canola oil from canola oil seed usually is effected as a separate operation from the protein isolate recovery procedure of the present invention.

Protein solubilization is effected most efficiently by using a food grade salt solution since the presence of the salt enhances the removal of soluble protein from the oil seed meal. The food grade salt usually is sodium chloride, although other salts, such as, potassium chloride, may be used. The food grade salt solution has an ionic strength of at least about 0.10, preferably at least about 0.15, to enable solubilization of significant quantities of protein to be effected. As the ionic strength of the salt solution increases, the degree of solubilization of protein in the oil seed meal initially increases until a maximum value is achieved. Any subsequent increase in ionic strength does not increase the total protein solubilized. The ionic strength of the food grade salt solution which causes maximum protein solubilization varies depending on the salt concerned and the oil seed meal chosen.

In view of the greater degree of dilution required for protein precipitation with increasing ionic strengths, it is usually preferred to utilize an ionic strength value less than about 0.8, and more preferably a value of about 0.15 to about 0.6.

The salt solubilization of the protein is effected at a temperature of at least about 5° C., preferably up to about 35° C., preferably accompanied by agitation to decrease the solubilization time, which is usually about 10 to about 60 minutes. It is preferred to effect the solubilization to extract substantially the maximum amount of protein from the oil seed meal, so as to provide an overall high product yield.

The lower temperature limit of about 5° C. is chosen since solubilization is impractically slow below this temperature while the preferred upper temperature limit of about 35° C. is chosen since the process becomes uneconomic at higher temperature levels in a batch mode.

The aqueous food grade salt solution and the oil seed meal have a natural pH of about 5 to about 6.8 to enable the protein isolate to be formed by the micellar route, as described in more detail below. The optimum pH value for maximum yield of protein isolate varies depending on the oil seed meal chosen.

At and close to the limits of the pH range, protein isolate formation occurs only partly through the micelle route and in lower yields than attainable elsewhere in the pH range. For these reasons, pH values of about 5.3 to about 6.2 are preferred.

The pH of the food grade salt solution may be adjusted to any desired value within the range of about 5 to about 6.8 for use in the extraction step by the use of any convenient food grade acid, usually hydrochloric acid, or food grade alkali, usually sodium hydroxide, as required.

The concentration of oil seed meal in the food grade salt solution during the solubilization step may vary widely. Typical concentration values are about 5 to about 15% w/v.

The protein extraction step with the aqueous salt solution has the additional effect of solubilizing fats which may be present in the canola meal, which then results in the fats being present in the aqueous phase.

The protein solution resulting from the extraction step generally has a protein concentration of about 5 to about 30 g/L, preferably about 10 to about 25 g/L.

The aqueous phase resulting from the extraction step then may be separated from the residual canola meal, in any convenient manner, such as by employing vacuum filtration, followed by centrifugation and/or filtration to remove residual meal. The separated residual meal may be dried for disposal.

The colour of the final canola protein isolate can be improved in terms of light colour and less intense yellow by the mixing of powdered activated carbon or other pigment adsorbing agent with the separated aqueous protein solution and subsequently removing the adsorbent, conveniently by filtration, to provide a protein solution. Diafiltration of the separated aqueous protein solution also may be used for pigment removal.

Such pigment removal step may be carried out under any convenient conditions, generally at the ambient temperature of the separated aqueous protein solution, employing any suitable pigment adsorbing agent. For powdered activated carbon, an amount of about 0.025% to about 5% w/v, preferably about 0.05% to about 2% w/v, is employed.

Where the canola seed meal contains significant quantities of fat, as described in the Murray II patents, then the defatting steps described therein may be effected on the separated aqueous protein solution and on the concentrated aqueous protein solution. When the colour improvement step is carried out, such step may be effected after the first defatting step.

As an alternative to extracting the oil seed meal with an aqueous food grade salt solution, such extraction may be made using water alone, although the utilization of water alone tends to extract less protein from the oil seed meal than the aqueous food grade salt solution. Where such alternative is employed, then the food grade salt, in the concentrations discussed above, may be added to the protein solution after separation from the residual oil seed meal in order to maintain the protein in solution during the concentration step described below. When a colour removal step and/or a first fat removal step is carried out, the food grade salt generally is added after completion of such operations.

Another alternative procedure is to extract the oil seed meal with the food grade salt solution at a relatively high pH value about 6.8, generally up to about 9.8. The pH of the food grade salt solution, may be adjusted in pH to the alkaline value by the use of any convenient food-grade alkali, such as aqueous sodium hydroxide solution. Where such alternative is employed, the aqueous phase resulting from the oil seed meal extraction step then is separated from the residual canola meal, in any convenient manner, such as by employing vacuum filtration, followed by centrifugation and/or filtration to remove residual meal. The separated residual meal may be dried for disposal.

The aqueous protein solution resulting from the high pH extraction step then is pH adjusted to the range of about 5 to about 6.8, preferably about 5.3 to about 6.2, as discussed above, prior to further processing as discussed below. Such pH adjustment may be effected using any convenient food grade acid, such as hydrochloric acid.

The aqueous protein solution then is concentrated to increase the protein concentration thereof while maintaining the ionic strength thereof substantially constant. Such concentration is effected to provide a concentrated protein solution having a protein concentration of at least about 200 g/L, preferably at least about 250 g/L.

The concentration step may be effected by any convenient selective membrane technique, such as ultrafiltration or diafiltration, using membranes, such as hollow-fibre membranes or spiral-wound membranes, with a suitable molecular weight cut-off, such as about 3000 to about 50,000 daltons, having regard to differing membrane materials and configurations.

The concentration step may be effected at any convenient temperature, generally about 20° C. to about 60° C., and for the period of time to effect the desired degree of concentration. The temperature and other conditions used to some degree depend upon the membrane equipment used to effect the concentration and the desired protein concentration of the solution.

The concentrating of the protein solution to a concentration above about 200 g/L in this step, significantly beyond levels previously contemplated and attained when employing the Murray I and Murray II processes, not only increases the process yield to levels above about 40 wt % in terms of the proportion of extracted protein which is recovered as dried protein isolate, preferably above about 80 wt %, but also decreases the salt concentration of the final protein isolate after drying. The ability to control the salt concentration of the isolate is important in applications of the isolate where variations in salt concentrations affect the functional and sensory properties in a specific food application.

As is well known, ultrafiltration and similar selective membrane techniques permit low molecular weight species to pass therethrough while preventing higher molecular weight species from so doing. The low molecular weight species include not only the ionic species of the food grade salt but also low molecular weight materials extracted from the source material, such as, carbohydrates, peptides, pigments and anti-nutritional factors, as well as any low molecular weight forms of the protein. The molecular weight cut-off of the membrane is usually chosen to ensure retention of a significant proportion of the protein in the solution, while permitting contaminants to pass through having regard to the different membrane materials and configurations.

Depending on the temperature employed in the concentration step, the concentrated protein solution may be warmed to a temperature of at least about 20° C., and up to about 60° C., preferably about 25° C. to about 40° C., to decrease the viscosity of the concentrated protein solution to facilitate performance of the subsequent dilution step and micelle formation. The concentrated protein solution should not be heated beyond a temperature above which the temperature of the concentrated protein solution does not permit micelle formation on dilution by chilled water. The concentrated protein solution may be subject to a further defatting operation, if required, as described in Murray II.

The concentrated protein solution resulting from the concentration step and optional defatting step then is diluted to effect micelle formation by adding the concentrated protein solution into a body of water having the volume required to achieve the degree of dilution desired. Depending on the proportion of canola protein desired to be obtained by the micelle route and the proportion from the supernatant, the degree of dilution of the concentrated protein solution may be varied. With higher dilution levels, in general, a greater proportion of the canola protein remains in the aqueous phase.

When it is desired to provide the greatest proportion of the protein by the micelle route, the concentrated protein solution is diluted by about 15 fold or less, preferably about 10 fold or less.

The body of water into which the concentrated protein solution is fed has a temperature of less than about 15° C., generally about 3° C. to about 15° C., preferably less than about 10° C., since improved yields of protein isolate in the form of protein micellar mass are attained with these colder temperatures at the dilution factors used.

The dilution of the concentrated protein solution and consequential decrease in ionic strength causes the formation of a cloud-like mass of highly associated protein molecules in the form of discrete protein droplets in micellar form. The protein micelles are allowed to settle to form an aggregated, coalesced, dense, amorphous sticky gluten-like protein micellar mass. The settling may be assisted, such as by centrifugation. Such induced settling decreases the liquid content of the protein micellar mass, thereby decreasing the moisture content generally from about 70% by weight to about 95% by weight to a value of generally about 50% by weight to about 80% by weight of the total micellar mass. Decreasing the moisture content of the micellar mass in this way also decreases the occluded salt content of the micellar mass, and hence the salt content of dried isolate.

The combination of process parameters of concentrating of the protein solution to a protein content of at least about 200 g/L and the use of a dilution factor less than about 15, result in higher yields, often significantly higher yields, in terms of recovery of protein in the form of protein micellar mass from the original meal extract, and much purer isolates in terms of protein content than achieved using any of the prior art procedures (Murray IA, IB and II) referred to above.

The settled isolate, in the form of an amorphous, aggregated, sticky, gelatinous, gluten-like protein mass, termed "protein micellar mass", or PMM, is separated from the residual aqueous phase or supernatant, such as by decantation of the residual aqueous phase from the settled mass or by centrifugation. The PMM may be used in the wet form or may be dried, by any convenient technique, such as spray drying, freeze drying or vacuum drum drying, to a dry form. The dry PMM has a high protein content, in excess of about 100 wt % protein (calculated as Kjeldahl N×6.25), and is substantially undenatured (as determined by differential scanning calorimetry). The dry PMM isolated from fatty oil seed meal also has a low residual fat content, when the procedure of Murray II is employed, which may be below about 1 wt %.

In accordance with one aspect of the invention, particularly as it is applied to canola protein, it has now been found that the supernatant from the PMM formation and settling step contains significant amounts of canola protein, not precipitated in the dilution step. It has not previously been proposed, in the Murray IA, IB and II patents, to attempt to recover additional protein from the supernatant and no observation is made in this prior art as to any potential protein content of the supernatant. In accordance with this aspect of the invention, steps are taken to recover the canola protein from the supernatant.

In such procedure, the supernatant from the dilution step, following removal of the PMM, may be concentrated to increase the protein concentration thereof. Such concentration is effected using any convenient selective membrane technique, such as ultrafiltration, using membranes with a suitable molecular weight cut-off permitting low molecular weight species, including the food grade salt and other non-proteinaceous low molecular weight materials extracted from the source material, to pass through the membrane, while retaining canola protein in the solution. Ultrafiltration membranes having a molecular weight cut-off of about 3000 to 10,000 daltons having regard to differing membranes and configurations, may be used. Concentration of the supernatant in this way also reduces the volume of liquid required to be dried to recover the protein, and hence the energy required for drying. The supernatant generally is concentrated to a protein content of about 100 to 400 g/L, preferably about 200 to about 300 g/L, prior to drying.

The concentrated supernatant may be dried by any convenient technique, such as spray drying, freeze drying or vacuum drum drying, to a dry form to provide a further canola protein isolate. Such further canola protein isolate has a high protein content, usually in excess of about 90 wt % protein (calculated as Kjeldahl N×6.25) and is substantially undenatured (as determined by differential scanning calorimetry). If desired, the wet PMM may be combined with the concentrated supernatant prior to drying the combined protein streams by any convenient technique to provide a combined canola protein isolate. The combined canola protein isolate has a high protein content, in excess of about 90 wt % (calculated as Kjeldahl N×6.25) and is substantially undenatured (as determined by differential scanning calorimetry).

In another alternative procedure, a portion only of the concentrated supernatant may be mixed with at least part of the PMM and the resulting mixture dried. The remainder of the concentrated supernatant may be dried as any of the remainder of the PMM. Further, dried PMM and dried supernatant also may be dry mixed in any desired relative proportions.

By operating in this manner, a number of canola protein isolates may be recovered, in the form of dried PMM, dried supernatant and dried mixtures of various proportions by weight of PMM and supernatant, generally from about 5:95 to about 95:5 by weight, which may be desirable for attaining differing functional and nutritional properties.

As an alternative to dilution of the concentrated protein solution into chilled water and processing of the resulting precipitate and supernatant as described above, protein may be recovered from the concentrated protein solution by dialyzing the concentrated protein solution to reduce the salt content thereof. The reduction of the salt content of the concentrated protein solution results in the formation of protein micelles in the dialysis tubing. Following dialysis, the protein micelles may be permitted to settle, collected and dried, as discussed above. The supernatant from the protein micelle settling step may be processed, as discussed above, to recover further protein therefrom. Alternatively, the contents of the dialysis tubing may be directly dried. The latter alternative procedure is useful where small laboratory scale quantities of protein are desired.

DESCRIPTION OF PREFERRED EMBODIMENT

Referring to FIG. 1, there is illustrated schematically a flow sheet of one embodiment to the invention. Canola oil seed meal and aqueous extraction medium are fed by line 10 to an extraction vessel 12 wherein the oil seed meal is extracted and an aqueous protein solution is formed. The slurry of aqueous protein solution and residual oil seed meal is passed by line 14 to a vacuum filter belt 16 for separation of the residual oil seed meal which is removed by line 18. The aqueous protein solution then is passed by line 20 to a clarification operation 22 wherein the aqueous protein solution is centrifuged and filtered to remove fines, which are recovered by line 24.

The clarified aqueous protein solution is pumped by line 26 through ultrafiltration membrane 28 to produce a concentrated protein solution as the retentate in line 30 with the permeate being recovered by line 32. The concentrated protein solution is passed into a precipitation vessel 34 containing cold water fed by line 36. Protein micellar mass formed in the precipitation vessel 34 is removed by line 38 and passed through a spray dryer 40 to provide dry canola protein isolate 42.

Supernatant from the precipitation vessel 34 is removed by line 44 and pumped through ultrafiltration membranes 46 to produce a concentrated protein solution as the retentate in line 48 with the permeate being removed by line 50. The concentrated protein solution is passed through a spray dryer 52 to provide further dry canola protein isolate 54.

As an alternative, the concentrated protein solution in line 48 may be passed by line 56 to mix with the protein micellar mass before the mixture then is dried in spray dryer 40.

EXAMPLES

Example 1

This Example illustrates the process of the invention.

'a' kg of commercial canola meal was added to 'b' L of 0.15 M NaCl solution at ambient temperature and agitated for 30 minutes to provide an aqueous protein solution having a protein content of 'c' g/L. The residual canola meal was removed and washed on a vacuum filter belt. The resulting protein solution was clarified by centrifugation to produce 'd' L of a clarified protein solution having a protein content of 'e' g/L.

The protein extract solution or a 'f' L aliquot of the protein extract solution was reduced in volume to 'g' L by concentration on an ultrafiltration system using 'h' dalton molecular weight cut-off membranes. The resulting concentrated protein solution had a protein content of 'i' g/L.

The concentrated solution at 'j' ° C. was diluted 'k' into 4° C. water. A white cloud of protein micelles formed immediately and was allowed to settle. The upper diluting water was removed and the precipitated, viscous, sticky mass (PMM) was recovered from the bottom of the vessel in a yield of 'l' wt % of the extracted protein and dried. The dried protein was found to have a protein content of 'm' wt % (N×6.25) d.b. The product was given designation 'n'. The parameters 'a' to 'n' are outlined in the following Table I:

TABLE I

| n | a | b | c | d | e | f | g | h | i | j | k | l | m |
|---|---|---|---|---|---|---|---|---|---|---|---|---|---|
| CPIA06-13 | 300 | 2500 | 13.0 | 1160 | 10.5 | (1) | 13 | 30000 | 303 | (2) | 1:10 | (2) | 106.5 |
| BW-AH12-G16-01 | 225 | 1500 | 19.6 | (2) | 17.5 | 600 | 30 | 3000 | 245 | 30 | 1:15 | (2) | 104.1 |
| BW-AL016-K15-1(3) | 1200 | 8000 | 14.9 | (2) | 10.4 | 400 | 40 | 10000 | 257 | 30 | 1:15 | 46 | 106.9 |
| CPI-A06-33 | 300 | 2000 | 10.8 | 1800 | 8.7 | (1) | 55 | 30000 | 217 | (2) | 1:10 | (2) | 104.3 |
| A11-04 | 300 | 2000 | 23.2 | 1772 | 21.7 | 1000 | 52 | 30000 | 240 | 34 | 1:15 | (2) | 107.2 |

Notes:
(1) All the protein extract solution was concentrated
(2) Not determined
(3) The concentrated retentate was diafiltered with 6 volumes of 0.15 M NaCl while holding the volume at 40 L prior to dilution.

Example 2

The process of Example 1 was repeated with the conditions of the procedure being varied. A number of parameters were studied.

(a) Extraction Parameters:

The extraction parameters were varied to ascertain their effect on the concentration of protein solution obtained. The results are tabulated in the following Table II:

TABLE II

| Extraction concentration | Extraction Temperature | Extraction Time | Concentration of NaCl solution | pH of extraction solution | Protein concentration |
|---|---|---|---|---|---|
| 5% w/v | 13° C. | 30 min | 0.15 M | 6.4 | 5.3 g/L |
| 15% w/v | 13° C. | 30 min | 0.15 M | 6.2 | 12.7 g/L |
| 15% w/v | 8° C. | 30 min | 0.15 M | — | 6.6 g/L |
| 15% w/v | 34° C. | 30 min | 0.15 M | — | 14.6 g/L |
| 15% w/v | 22° C. | 10 min | 0.15 M | 5.9 | 10.5 g/L |
| 15% w/v | 13° C. | 60 min | 0.15 M | 5.9 | 10.6 g/L |
| 10% w/v | 15° C. | 30 min | 0.15 M | — | 9.7 g/L |
| 10% w/v | 13° C. | 70 min | 0.15 M | — | 9.3 g/L |

TABLE II-continued

| Extraction concentration | Extraction Temperature | Extraction Time | Concentration of NaCl solution | pH of extraction solution | Protein concentration |
|---|---|---|---|---|---|
| 10% w/v | 13° C. | 30 min | 0.15 M | 5.3 | 9.8 g/L |
| 10% w/v | 13° C. | 30 min | 0.15 M | 6.2 | 10.6 g/L |

(b) Dilution Parameters:

The dilution parameters were varied to ascertain their effect on yield of PMM from the dilution step. The results are tabulated in the following Table III:

TABLE III

| Protein Concentration | Dilution Water Temperature | Dilution Ratio | PMM Recovery |
|---|---|---|---|
| 206 g/L | 4° C. | 1:10 | 51.7% |
| 258 g/L | 4° C. | 1:10 | 61.8% |
| 283 g/L | 4° C. | 1:10 | 42.6% |
| 230 g/L | 15° C. | 1:10 | 4.5% |
| 249 g/L | 4° C. | 1:5 | 40.4% |
| 249 g/L | 4° C. | 1:3 | 30.7% |

Example 3

This Example illustrates the effect of dilution water temperature on the yield of product protein isolate.

1200 kg of commercial canola meal was added to 8000 L of 0.15 M NaCl solution at ambient temperature and agitated 30 minutes to provide an aqueous protein solution having a protein content of 17.4 g/L. The residual canola meal was removed and washed on a vacuum filter belt. The resulting protein solution was clarified by centrifugation to produce 7464 L of a clarified protein solution having a protein content of 14.8 g/L The protein extract solution was reduced in volume by concentration on an ultrafiltration system utilizing 3,000 dalton membranes. The resulting concentrated protein solution had a protein content of 230 g/L.

A 50 ml aliquot of the concentrated solution was warmed to 30° C. then diluted 1:10 into 15° C. tap water. A slight white cloud of very small micelles formed and was allowed to settle. The upper diluting water was removed leaving a very small amount of precipitate. The precipitate only represented 4.5 wt % of the protein in the 50 ml aliquot of the concentrated solution instead of a typical 50 wt % recovery achieved when diluted into 4° C. tap water. The 50 ml aliquot was taken from the batch with the designation BW-AH012-H14-01A. The data from this Example are also presented in Table III above with respect to the dilution ratio.

Example 4

This Example shows the effect of temperature of concentrated solution on dilution yield.

1200 kg of commercial canola oil seed meal was added to 8000 L of 0.15 M NaCl solution at ambient temperature and agitated for 30 minutes at 13° C. to provide an aqueous protein solution having a protein content of 'a' g/L. The residual canola meal was removed and washed on a vacuum filter belt. The resulting protein solution was clarified by centrifugation to produce a clarified solution having a protein content of 'b' g/L.

The clarified protein solution or a 'c' aliquot of the protein extract solution was reduced in volume to 'd' L on a ultrafiltration system using a 'e' dalton molecular weight cut-off membrane. The resulting concentrated protein solution had a protein content of 'f' g/L. The lots were given designation 'g'.

The parameter 'a' to 'g' are given in the following Table IV:

TABLE IV

| g | BW-AL011-J16-01A | BW-AL017-D11-02A |
|---|---|---|
| a | 24.4 | 26.3 |
| b | 20.3 | 18.0 |
| c | (1) | 2000 |
| d |  | 152 |
| e | 3000 | 5000 |
| f | 287 | 285.9 |

Note:
(1) All the protein extract solution was concentrated.

50 ml retentate aliquots of lot BW-AL011-J16-01A were warmed to 30° C. and 60° C. before being diluted 1:10 into 4° C. water. In each case, a white cloud of protein micelles formed immediately and was allowed to settle. The upper diluting water was removed and the precipitated, viscous, sticky mass (PMM) was dried. The PMM was recovered from each experiment and the yield of the dilution step was calculated. In the case of the retentate temperature being 30° C., the protein recovery was 57.1 wt %, while for 60° C., the yield was 23.7 wt %.

5 ml retentate aliquots of lot BW-AL017-D11-02A were warmed to various temperatures between 30° C. and 60° C. and then diluted at dilution ratio of 1:10 or 1:15 into 4° C. water. In each case, a white cloud of protein micelles formed immediately and was allowed to settle. The upper diluting water was removed and the precipitated, viscous, sticky mass (PMM) was dried. The PMM was recovered from each experiment and the yield of the dilution step was calculated. The results obtained appear in the following Table V:

TABLE V

| Retentate Temperature | Dilution Ratio | PMM Yield |
|---|---|---|
| 30° C. | 1:10 | 49% |
| 40° C. | 1:10 | 49 |
| 50° C. | 1:10 | 47 |
| 60° C. | 1:10 | 35 |
| 30° C. | 1:15 | 51 |
| 40° C. | 1:15 | 51 |
| 50° C. | 1:15 | 39 |
| 60° C. | 1:15 | 39 |

As may be seen from this Table, higher yields are obtained at moderately elevated temperatures while higher elevated temperatures tend to reduce yields.

Example 5

This Example illustrates the preparation of further canola protein isolates using various combinations of parameters and additionally including treatment with powdered activated carbon.

'a' kg of commercial canola meal was added to 'b' L of 0.15 M NaCl solution at ambient temperature and agitated 'c' minutes to provide an aqueous protein solution having a protein content of 'd' g/L. The residual canola meal was removed and washed on a vacuum filter belt. The resulting protein solution was clarified by centrifugation to produce a clarified protein solution having a protein content of 'e' g/L.

'f' wt % powdered Activated Carbon (PAC) was added to the clarified solution. The suspension was mixed for 15 minutes, following which the PAC was removed by filtration, resulting in 'g' L of a 'h' g/L extract.

A 'i' L aliquot of the protein extract solution from the PAC treatment step was reduced in volume to 'j' L on an ultrafiltration system using a 30,000 dalton molecular weight cut-off membrane. The resulting concentrated protein solution had a protein content of 'k' g/L.

The concentrated solution at 'l' ° C. was diluted 1: 'm' into 4° C. tap water. A white cloud formed immediately and was allowed to settle. The upper diluting water was removed and the precipitated, viscous, sticky mass was dried. The dried protein which was formed had a protein content of 'n' wt % protein (N×6.25 d.b.). The overall protein recovery i.e. the average of dried protein isolate expressed as a percentage of the protein solubilized in the extraction step, was 'o' wt %. The product was given designation CPI 'p'.

The specific parameters "a" to "p" for these different samples of protein product are set forth in the following Table VI:

TABLE VI

| p | a | b | c | d | e | f | g | h | i | j | k | l | m | n | o |
|---|---|---|---|---|---|---|---|---|---|---|---|---|---|---|---|
| A07-15 | 150 | 1000 | 30 | 14.0 | 13.1 | 2 | 700 | 8.9 | 460 | 21 | 246 | 30 | 10 | 103.5 | 44 |
| A07-22 | 150 | 1000 | 120 | 13.0 | 12.3 | 4 | 800 | 8.2 | 800 | 9 | 490 | 20 | 5 | 106.9 | (1) |
| A08-02 | 300 | 2000 | 300 | 14.0 | 14.5 | 0.06 | 1300 | 13.8 | 480 | 6 | 421 | 25 | 5 | 105.8 | (1) |
| A10-13 | 300 | 2000 | 45 | 28.6 | 24.9 | 1 | 2150 | 22.7 | 1000 | 80 | 176 | 20 | 10 | 109.2 | (1) |

Note:
(1) not determined.

The effect of the addition of powdered activated carbon on colour of canola protein isolate is shown in Example 7 below.

Example 6

This Example illustrates an embodiment of the invention, wherein water was used in the extraction stage and salt was subsequently added.

150 kg of commercial canola meal was added to 1000 L of water at 13° C., agitated for 30 minutes resulting in a protein solution with a concentration of 4.5 g/L. The residual canola meal was removed and washed on a vacuum filter belt. The aqueous protein solution was clarified by centrifugation producing 1100 L of a 3.8 g/L extract.

Powdered activated carbon (PAC) was precoated on filter pads before the clarified solution was filtered producing 1000 L of a 3.2 g/L extract.

Sodium chloride was added to the latter protein solution to a concentration of 0.15M. The volume of the protein solution was reduced to 10 L on an ultrafiltration system using 30,000 dalton membranes. The concentrated solution had a protein content of 292 g/L. An aliquot of the concentrated protein solution was warmed to 30° C. prior to dilution 1:3 into 4° C. water.

A white cloud formed immediately and was allowed to settle. The upper diluting water was removed and the precipitated, viscous, sticky mass (PMM) was dried. The dried canola protein isolate, given identification CPI A07-18, had a protein content of 96 wt % protein (N×6.25). The recovery of protein was 59 wt % of the protein originally extracted.

Example 7

This Example provides a comparison of the colour of certain canola protein isolates produced herein in comparison to spray dried egg white, conventional soy protein isolate and products produced according to Murray II.

Samples of protein isolate were evaluated for lightness (L) and chromaticity (a and b) using a Minolta colourimeter. In the L a b colour space, the value moves from 0 to 100, with 100 being white and 0 being black. The chromaticity coordinates, a and b, both have maximum values of +60 and −60, +a being the red direction, −a being the green direction, +b being the yellow direction and −b being the blue direction.

The following Table VII sets forth the results obtained:

TABLE VII

| Sample | L | a | b | Comments |
|---|---|---|---|---|
| Egg White | 90.34 | −2.73 | 21.43 | |
| Soy Protein Isolate | 85.10 | −0.906 | 14.67 | The a and b values are not as close to egg white as PAC treated CPI |
| CPI A07-15 (Example 5) | 82.77 | −2.13 | 22.98 | NaCl extraction with high (2%) PAC |
| CPI A07-18 (Example 6) | 82.80 | −2.69 | 25.19 | Water extraction with PAC |
| CPI A06-33 (Example 1) | 75.60 | 0.404 | 26.51 | NaCl extraction without PAC |
| CPI A08-02 (Example 5) | 80.04 | −2.87 | 23.37 | NaCl extraction with low (0.06%) PAC |
| Murray II | 65.81 | 0.962 | 18.27 | Relatively dark product |

The results set forth in Table VII show the beneficial effect on colour, namely more white, less yellow, by the use of powdered activated carbon.

Example 8

This Example illustrates the preparation of further canola protein isolate including protein recovered from supernatant.

'a' kg of commercial canola meal was added to 'b' L of 0.15 M NaCl solution at ambient temperature and agitated for 30 minutes to provide an aqueous protein solution having a protein content of 'c' g/L. The residual canola meal was removed and washed on a vacuum filter belt. The resulting protein solution was clarified by centrifugation to produce a clarified protein solution having a protein content of 'd' g/L followed by the addition of 1 wt % Powdered Activated Carbon (PAC).

The suspension was mixed for 15 minutes, following which the PAC was removed by filtration, resulting in 'e' L of a 'f' g/L extract.

A 'g' L aliquot of the protein extract solution from the PAC treatment step was reduced in volume to 'h' L on an ultrafiltration system using 30,000 dalton molecular weight cut-off membranes. The resulting concentrated protein solution had a protein content of 'i' g/L.

The concentrated solution at 'j' ° C. was diluted 1: 'k' into 4° C. water. A white cloud formed immediately and was allowed to settle. The upper diluting water was removed and was reduced in volume by ultrafiltration using 3000 dalton molecular weight cut-off membranes by a volume reduction factor of 'l'. The concentrate was added to the precipitated, viscous, sticky mass and the mixture was dried. The dried protein mixture which was formed had a protein content of 'm' wt % of protein (N×6.25). The product was given designation CPI 'n'.

The specific parameters 'a' to 'n' for two different samples of protein product are set forth in the following Table VIII:

TABLE VIII

| n | a | b | c | d | e | f | g | h | i | j | k | l | m |
|---|---|---|---|---|---|---|---|---|---|---|---|---|---|
| A10-04 | 300 | 2000 | 28.4 | 27.6 | 1330 | 16.3 | 200 | 18 | 186 | 28 | 10 | 11 | 100.3 |
| A10-05 | 300 | 2000 | 27.7 | 21.9 | 1320 | 21.9 | 300 | 20 | 267 | 27 | 15 | 21 | 102.3 |

Example 9

This Example further illustrates the preparation of further canola protein isolate including protein recovered from supernatant without PAC treatment.

'a' kg of canola meal was added to 'b' L of 0.15 M NaCl solution at a temperature of 20° C. and agitated for 30 minutes to provide an aqueous protein solution having a protein content of 'c' g/L. The resulting canola meal was removed and washed on a vacuum filter belt. The resulting protein solution was clarified by centrifugation and filtration to produce a clarified protein solution having a protein content of 'd' g/L.

The protein extract solution or a 'e' L aliquot of the protein extract solution was reduced in volume on an ultrafiltration system using membranes having a molecular weight cut-off of 'f' daltons. The resulting concentrated protein solution had a protein content of 'g' g/L.

The concentrated solution at 'h' ° C. was diluted 'i' into 'j' ° C. water. A white cloud immediately formed and was allowed to settle. The upper diluting water was removed and concentrated by ultrafiltration using 3000 dalton molecular weight cut-off membranes to provide a concentrated supernatant having a protein content of 'k' g/L. The concentrate was added to the precipitated, viscous, sticky mass and the mixture dried.

The dried protein mixture was found to have a protein content of 'l' wt % (N×6.25). The yield of canola protein isolate from the protein solution extract was 'm' wt %. The product was given designation 'n'.

The specific parameters "a" to 'n' for two different samples of protein product are set forth in the following Table IX:

TABLE IX

| n | BW-AL11-I21-01A | A11-01 |
|---|---|---|
| a | 1200 | 300 |
| b | 8000 | 2000 |
| c | 24.5 | 23.7 |
| d | 17.8 | 20.7 |
| e | (1) | 400 |
| f | 3000 | 30,000 |
| g | 284.7 | 200.2 |
| h | 31 | 32 |
| i | 1:10 | 1:15 |
| j | 8 | 4 |
| k | 279.0 | 104.7 |
| l | 100.2 | 102.8 |
| m | 68.1 | (2) |

Note:
(1) All the protein extract solution was concentrated
(2) not determined

Example 10

This Example illustrates extraction of the canola protein meal at a relatively high pH and recovery of protein from supernatant.

150 kg of commercial canola meal was added to 2000 L of 0.15 M NaCl having a pH adjusted to 9.5 by the addition of sodium hydroxide at ambient temperature, agitated for 30 minutes to provide an aqueous protein solution having a protein content of 13.2 g/L. The residual canola meal was clarified by centrifugation and filtration to produce 1210 L of a clarified protein solution having a protein content of 12.1 g/L.

The pH of the clarified protein solution was adjusted to 6.2 by the addition of hydrochloric acid. A 900 L aliquot of the protein extract solution was reduced in volume to 50 L by concentration on an ultrafiltration system using 3000 dalton molecular weight cut-off membranes. The resulting concentrated protein solution had a protein content of 276.2 g/L.

The concentrated solution at 30° C. was diluted 1:15 into 4° C. water. A white cloud formed immediately and was allowed to settle. The upper diluting water was removed and 390 L of this supernatant were concentrated by 24 L by ultrafiltration using 3000 dalton molecular weight cut-off membranes to provide a concentrated supernatant having a protein content of 149.0 g/L. The concentrate was added to the precipitated, viscous, sticky mass and the mixture dried.

The dried protein mixture was found to have a protein content of 103.3 wt % (N×6.25). The yield of canola protein isolate from the protein solution extract was 48.3 wt %. The product was given designation BW-AL017-D08-02A.

Example 11

This Example illustrates the preparation of canola protein isolate by processing of supernatant.

'a' kg of commercial canola meal was added to 'b' L of 0.15 M NaCl solution at ambient temperature and agitated for 30 minutes to provide an aqueous protein solution having a protein content of 'c' g/L. The residual canola meal was removed and washed on a vacuum filter belt. The resulting protein solution was clarified by centrifugation to produce a clarified protein solution having a protein content of 'd' g/L.

The clarified protein solution was reduced in volume on an ultrafiltration system using 3,000 dalton molecular weight cut-off membranes. The resulting concentrated solution had a protein content of 'e' g/L.

The concentrated solution at 'f' ° C. was diluted 'g' into 4° C. water. A white cloud formed immediately and was allowed to settle. The upper diluting water was removed and the precipitated, viscous, sticky mass (PMM) was recovered from the bottom of the vessel and dried. The dried protein was found to have protein content of 'k' wt % (N×6.25) d.b.

The removed upper diluting water was reduced in volume by ultrafiltration using 3,000 dalton molecular weight cut-off membranes to a protein concentration of 'i' g/L. The concentrate then was dried. The dried protein which was formed had a protein content of 'j' wt % (N×6.25). The product was given designation 'l'.

The specific parameters 'a' to 'l' for two different samples of protein product are set forth in the following Table X:

TABLE X

| l | AL016-J24 | AL011-J16-01A |
|---|---|---|
| a | 1200 | 1200 |
| b | 8000 | 8000 |
| c | 22.7 | 24.4 |
| d | 16.9 | 20.3 |
| e | 281 | 287 |
| f | 37 | 28 |
| g | 1:10 | 1:10 |
| h | (2) | 101.9 |
| i | (3) | 265 |
| j | 103.9 | 101.5 |
| k | (2) | 101.6 |

Note:
(1) All the protein extract solution was concentrated
(2) Not determined
(3) The supernatant was concentrated by a volume reduction factor of 16.

Example 12

This Example illustrates application of the process of the invention to cold pressed canola meal and the recovery of additional protein from the supernatant.

50 kg of canola meal was pressed and 13 L of oil recovered. 30 kg of the resulting crushed meal was added to 300 L of 0.15M NaCl solution at 20° C. and the mixture was agitated for 40 minutes, followed by a thirty minute settling period. 200 L of aqueous protein solution were obtained having a protein content of 19.5 mg/ml.

The aqueous protein solution was chilled to 4° C. and refrigerated at that temperature for 16 hours, to permit fat present in the meal and extracted in the extraction step, to separate, according to the procedure of Murray II. The resulting fat layer was removed from the surface of the aqueous protein solution. The remaining aqueous protein solution was filtered through a filter press having a 20 μm filter pad to remove remaining particles of hull and cell wall material as well as residual particles of fat. 200 L of filtrate with a protein content of 14.6 mg/ml were obtained.

The aqueous protein solution was reduced in volume to 10.5 L by concentration on an ultrafiltration system using 10,000 dalton molecular weight cut-off membranes. The resulting concentrated protein solution had a protein content of 200 g/L, which represented a yield of 67 wt % of the protein originally extracted from the canola meal. The resulting 10.5 L solution was again chilled to 4° C. and refrigerated at this temperature for 16 hours. The solution was then centrifuged at 10,000×g for five minutes and the separated fat removed from the concentrated protein solution.

The protein solution was warmed to 30° C. and was added to water at 4° C. at a dilution ratio of 1:9. Following overnight settling, 85 L of supernatant was decanted leaving approximately 9 L of precipitated, viscous, sticky mass (PMM). The PMM was further concentrated by centrifugation at 10,000×g for 5 minutes and an aliquot of the centrifuged PMM was freeze dried to determine its protein content. The freeze dried PMM was found to have a protein content of 105.5 wt % (N×6.25).

The supernatant from the PMM formation step was concentrated to 11 L by concentration on a ultrafiltration system using 10,000 dalton molecular weight cut-off membranes. This latter concentrated solution had a protein concentration of 89.7 mg/ml. An aliquot of this concentrated solution was freeze dried to determine the protein content. The freeze-dried protein was found to have a protein content of 101.7 wt % (N×6.25).

The overall yield of protein as PMM and recovered from the supernatant from the protein extracted from the canola meal was 50 wt %.

Example 13

This Example illustrates application of the process of the invention to high erucic acid rapeseed.

35 kg of commercial high erucic acid rapeseed meal was added to 350 L of 0.3 M NaCl solution (10% w/v) at 15° C. and agitated for one hour to provide an aqueous protein solution having a protein content of 7.71 g/L. A second run under the same conditions produced an aqueous protein solution having a protein content of 7.36 g/L. The extract solutions were decanted and clarified by filtration through 20 μm filter pads to remove residual meal and to provide a total filtrate volume of 550 L.

The filtrate then was concentrated to 9 L using a hollow fibre ultrafiltration system having 10,000 dalton molecular cut-off membranes. The resultant concentrated protein solution had a protein content of 232 g/L.

The concentrated protein solution, at a temperature of 30° C., was then diluted 1:9 into 4° C. water. A white cloud immediately formed and was allowed to settle for 16 hours at 4° C. 80 L of supernatant was decanted and was reduced in volume by diafiltration concentration to a volume of 7 L of concentrated supernatant having a protein content of 47.7 g/L.

The settled viscous sticky mass (PMM) was collected and freeze dried. A one liter portion of the concentrated supernatant was freeze dried. 1393 g of freeze dried PMM was obtained from the process having a protein content of 106 wt % (N×6.25). 1 L of freeze-dried concentrated supernatant yielded 67 g, so that the 7 L of concentrated supernatant contained 469 g of dried protein, for an overall protein yield from the protein extracted from the oil seed meal of 47 wt %. The freeze-dried concentrated supernatant had a protein content of 83 wt % (N×6.25) so that a mixture of PMM and protein from concentrated supernatant has a protein content of 102 wt % (N×6.25) on a dry weight basis.

Example 14

This Example illustrates application of the invention to mustard seed.

75 g of commercial mustard seed meal was added to 750 ml of 0.15 M NaCl solution (15% w/w) at 20° C. and agitated for 30 minutes. The extraction slurry was centrifuged at 10,000×g for 10 minutes to separate the spent meal from the extracted protein. The resulting 500 ml of protein solution having a protein content of 18.05 mg/ml was then filtered through Whatman #4 filters in order to further clarify the solution.

The clarified solution was concentrated to 27 ml on a Millipore mini-ultrafiltration stirred cell system using 10,000 molecular weight cut-off membranes. The resulting concentrated protein solution had a protein concentration of 218 g/L.

22.2 ml of the total 27 ml of concentrated protein solution, at a temperature of 30° C., was then diluted 1:9 into 4° C. tap water. A white cloud immediately formed and was allowed to settle for 16 hours at 4° C. 200 ml of supernatant was decanted.

The settled viscous, sticky mass (PMM) was collected and centrifuged at 10,000×g for 5 minutes to reduce the moisture content of the pellet, which then was freeze dried. 4.48 g of freeze-dried pellet was obtained, representing a yield of protein in the freeze-dried pellet from the protein in the protein extracted from the oil seed meal was 50 wt % (if the entire 27 ml of retentate had been diluted, the final yield is extrapolated to be approximately 60 wt %). The freeze-dried PMM obtained from the process had a protein content of 103 wt % (N×6.25).

Example 15

This Example illustrates application of the process of the invention to non-GMO canola.

450 g of non-GMO canola meal was added to 3 L of 0.15 M NaCl solution (15% w/w) at 20° C. and agitated for 30 minutes to provide an aqueous protein solution having a protein content of 8.08 g/L. The mixture was allowed to stand for 30 minutes to permit residual meal and protein solution to separate. The protein solution was decanted, centrifuged for 10 minutes at 10,000×g and filtered through Whatman #4 filter paper to further clarify the solution.

The filtrate then was concentrated to a volume of 17 ml using a hollow fibre ultrafiltration system having 10,000 dalton molecular cut-off membranes. The resultant concentrated protein solution has a protein content of 205 g/L.

A 14 ml sample of the retentate, at a temperature of 30° C., was then diluted 1:9 into 4° C. tap water. A white cloud immediately formed and was allowed to settle. The supernatant was decanted and the settled viscous sticky mass (PMM) was collected and freeze-dried. 2.3 g of freeze-dried PMM was obtained from the process having a protein content of 103 wt % (N×6.25).

The overall yield of protein with respect to the protein extract from the oil seed meal was 41 wt %. If the entire 17 ml of retentate had been diluted approximately 2.66 g of dried protein would have been recovered for a yield of 46 wt %.

Example 16

This Example illustrates recovery of canola protein isolate by a dialysis procedure.

'a' kg of commercial canola meal was added to 'b' L of 0.15 M NaCl solution at ambient temperature and agitated for 30 minutes to provide an aqueous protein solution having a protein content of 'c' g/L. The residual canola meal was removed and washed on a vacuum filter belt. The resulting protein solution was clarified by centrifugation to produce 'd' L of a clarified protein solution having a protein content of 'e' g/L.

A 'f' aliquot of the protein extract solution was reduced in volume to 'g' L by concentration on an ultrafiltration system using 'h' dalton molecular weight cut-off membranes. The resulting concentrated solution had a protein content of 'i' g/L. The retentate was given designation 'j'. The parameters 'a' to 'j' are outlined in the following Table XI:

TABLE XI

| j | BW-AL017-D17-02A | BW-AL017-D22-02A |
|---|---|---|
| a | 150 | 150 |
| b | 1004 | 1003 |
| c | 25.1 | 27.1 |
| d | 1080 | 1132 |
| e | 18.0 | 16.5 |
| f | 710 | 1092 |
| g | 22.5 | 31.5 |
| h | 5000 | 5000 |
| i | 291.6 | 362.5 |

3.5 L of retentate from BW-AL017-D17-02A was dialyzed in 120 L of 4° C. water. The water was changed daily for several days and running water was used for the last two days. The conductivity of the retentate dropped from 6.89 millisiemens (ms) to 0.32 ms. As the conductivity dropped, micelles began to form in the retentate. At the completion of the dialysis, a large amount of PMM was present at the bottom of each dialysis tube. The PMM was recovered and dried. The canola protein isolate had a protein content of 103.0 wt % d.b.

The procedure was repeated with the retentate BW-AL017-D22-02A except that the dialysis was carried out in 60° C. water. As the conductivity decreased, the solution became cloudy but very little micelle formation occurred. Once the dialyzed solution was cooled to 10° C., micelle formation occurred. The resulting PMM, when dried, had a protein content of 106 wt % of d.b.

SUMMARY OF DISCLOSURE

In summary of this disclosure, the present invention provides a novel procedure for isolating protein from oil seeds in improved yields and protein content than has previously been achieved. Modifications are possible within the scope of this invention.

What we claim is:

1. A process of preparing a mustard seed protein isolate, which comprises:
   (a) extracting a mustard seed meal at a temperature of at least about 5° C. to cause solubilization of mustard seed protein in said mustard seed meal and to form an aqueous mustard seed protein solution having a mustard seed protein content of about 5 to about 30 g/L and a pH of about 5 to about 6.8,
   (b) separating the aqueous mustard seed protein solution from residual mustard seed meal,
   (c) increasing the protein concentration of said aqueous mustard seed protein solution to at least about 200 g/L while maintaining the ionic strength substantially constant by using a selective membrane technique to provide a concentrated mustard seed protein solution,
   (d) diluting said concentrated mustard seed protein solution into chilled water having a temperature below about 15° C. to cause the formation of mustard seed protein micelles,
   (e) settling the mustard seed protein micelles to form an amorphous, sticky, gelatinous, gluten-like mustard seed protein micellar mass, and (f) recovering the mustard seed protein micellar mass from supernatant having a mustard seed protein content of at least about 100 wt % as determined by Kjeldahl nitrogen×6.25 on a dry weight basis.

2. The process of claim 1 wherein said extracting of said mustard seed meal is effected using an aqueous food grade salt solution having an ionic strength of at least about 0.10 and a pH of about 5 to about 6.8.

3. The process of claim 2 wherein said food grade salt solution has an ionic strength of about 0.15 to about 0.6.

4. The process of claim 2 wherein said food grade salt solution has a pH of about 5.3 to about 6.2.

5. The process of claim 2 wherein said extracting of said mustard seed meal is effected with agitation of said aqueous food grade salt solution for about 10 to about 30 minutes.

6. The process of claim 5 wherein the concentration of mustard seed meal in said aqueous food grade salt solution during said extracting step is about 5 to about 15% w/w.

7. The process of claim 2 wherein said aqueous mustard seed protein solution resulting from the extraction step has a concentration of about 10 to about 25 g/L.

8. The process of claim 1 wherein said extracting of said mustard seed meal is effected using an aqueous food grade salt solution having an ionic strength of at least about 0.10 and a pH of about 6.8 to about 9.8 and, following said separation of the aqueous mustard seed protein solution from residual mustard seed meal, the pH of the aqueous mustard seed protein solution is adjusted to a pH of about 5 to about 6.8.

9. The process of claim 8 wherein said food grade salt solution has a ionic strength of about 0.15 to about 0.6.

10. The process of claim 8 wherein the pH of the aqueous protein solution is adjusted to a pH of 5.3 to about 6.2.

11. The process of claim 1 wherein said mustard seed meal is extracted by water and subsequent thereto food grade salt is added to the resulting aqueous mustard seed protein solution to provide an aqueous mustard seed protein solution having an ionic strength of at least about 0.10.

12. The process of claim 1 wherein said concentration step is effected by ultrafiltration at a temperature of about 20° C. to about 60° C. to produce a concentrated mustard seed protein solution having a mustard seed protein content of at least about 250 g/L.

13. The process of claim 1 wherein said concentrated mustard seed protein solution is warmed to a temperature of at least about 20° C. to decrease the viscosity of the concentrated mustard seed protein solution but not beyond a temperature above which the temperature of the concentrated mustard seed protein solution does not permit micelle formation upon dilution.

14. The process of claim 13 wherein said concentrated mustard seed protein solution is warmed to a temperature of about 25° C. to about 40° C.

15. The process of claim 1 wherein said concentrated mustard seed protein solution is diluted by about 15 fold or less by adding the concentrated mustard seed protein solution into a body of water having the volume required to achieve the desired degree of dilution.

16. The process of claim 15 wherein said body of water has a temperature of less than about 10° C.

17. The process of claim 16 wherein said concentrated mustard seed protein solution is diluted by about 10 fold or less.

18. The process of claim 1 wherein the recovered mustard seed protein micellar mass is dried to a proteinaceous powder.

19. The process of claim 1 wherein, as an alternative to said diluting, settling and recovering steps, the concentrated mustard seed protein solution is dialyzed to reduce the salt content thereof and to cause the formation of mustard seed protein micelles, and recovering a mustard seed protein isolate from the dialyzed concentrated mustard seed protein solution having a mustard seed protein content of at least about 100 wt % as determined by Kjeldahl nitrogen×6.25 on a dry weight basis.

20. The process of claim 19 wherein said protein isolate recovery is effected by drying the dialyzed concentrated protein solution.

* * * * *